Oct. 14, 1969

W. B. KING 3,472,419

FLAME ARRESTOR

Filed July 27, 1966

INVENTOR.
WALTER B. KING
BY Robert Q. Richardson
- ATTORNEY -

United States Patent Office 3,472,419
Patented Oct. 14, 1969

3,472,419
FLAME ARRESTOR
Walter B. King, Los Angeles, Calif., assignor, by mesne assignments, to McDonnell Douglas Corporation, Santa Monica, Calif., a corporation of Maryland
Filed July 27, 1966, Ser. No. 568,337
Int. Cl. B65d 25/00
U.S. Cl. 220—88                                    10 Claims

ABSTRACT OF THE DISCLOSURE

A flame arrestor with baffles and having a fluid trap restriction to prevent a flame from following the vapor in a vent duct to the fuel tank that is vented by said duct.

BACKGROUND OF THE INVENTION

Fuel tanks are vented to the atmosphere in order to compensate for temperature and/or altitude changes which affect pressure on the fuel in the tank. If the vapor in such a passageway is ignited, it will travel into the fuel tank and cause violet tank explosions, particularly if the passageway is of small cross-section compared to its length from atmosphere back into the tank.

Fuel tanks, particularly those in aircraft, have vents to the atmosphere to permit air in the fuel tanks to be released during ascent, and to travel into the tank during descent. In venting to the atmosphere, these conductors sometimes extend from the fuel tanks an appreciable distance and usually contain enough vapor to readily ignite should a flame appear nearby, such as upon the ocurrence of a ground fire, a minor crash or upon the occurrence of a lightning bolt. These vapors readily carry the flame back into the tank. The vapors, as they burn, cause a sudden rise in pressure and, because of the pressures, an explosion is likely to occur, rupturing the fuel tank, and causing a blazing inferno.

One solution to this problem resulting from vapor ignition is to devise a means to prevent the flame at the entrance of the vent from traveling through the vent conductor back to the fuel tank. In one such solution, an infrared detector was placed at the opening, and upon the detection of a flame, it caused a fire extinguishing agent to discharge into the vent passageway to the tank. After each occurrence, the extinguishing agent had to be replaced and the detector prepared for the next potential flame.

SUMMARY OF THE INVENTION

In accordance with the present invention, a restriction is placed in the vent passageway continuously and is operable at all times, even in the absence of a flame. In a preferred embodiment, this is done with the use of fuel or other liquid forming a fluid trap in a container near the end of the vent that is remote from the tank. When used in an aircraft or other vehicle having a changing attitude, suitable baffling and deflection is necessary to retain the fluid barrier in the trap at all times. The container housing must trap the fluid barrier from spilling, must be of low volume above the barrier, and have a large vent to the atmosphere so that little pressure can build up when flames ignite the vapor in this passageway. The ignition of vapors in a small volume with a large exhaust opening rapidly consumes the available oxygen, thus terminating the combustion.

It is therefore an object of the present invention to provide for a flame arrestor apparatus.

Another object is the provision of a flame arrestor apparatus for moving vehicles.

A further object is the provision of a flame arrestor apparatus using a fluid trap in the vent to atmosphere passageway of a fuel tank.

Another object is the provision of a flame arrestor apparatus for use in the vent conductor system between a fuel tank and atmosphere wherein the apparatus has a fluid trap with baffles and deflections to prevent loss of the fluid during changing attitude of the vehicle within which it is contained.

Other objects will become more apparent as a description of the invention proceeds, having reference to the drawings, wherein:

DESCRIPTION OF EMBODIMENT

Figure 1:
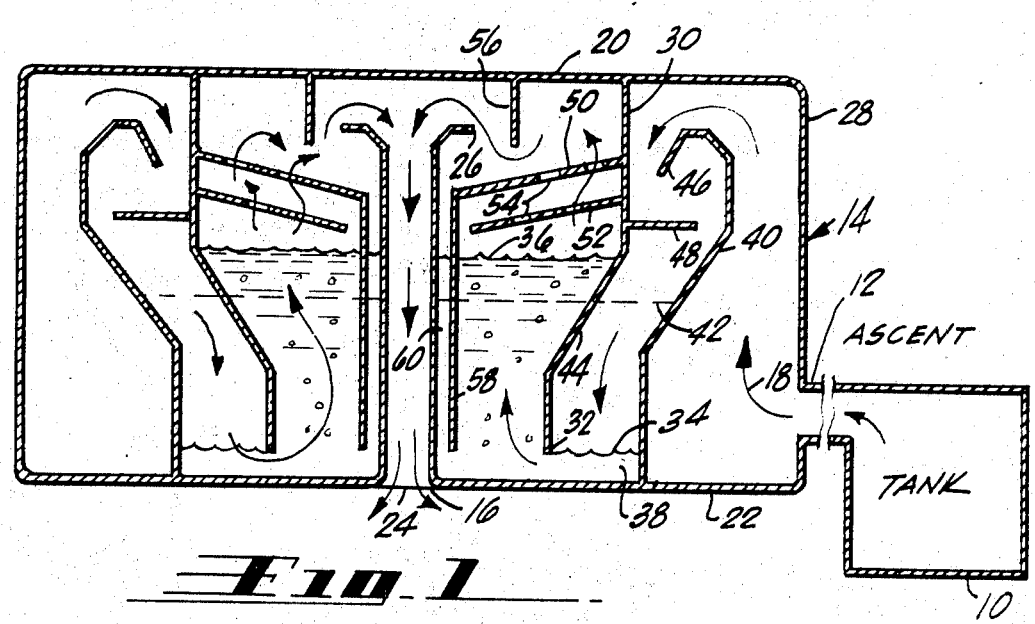
FIGURE 1 is a cross-sectional view of the flame arrestor tank showing the fluid levels and airflow direction as an aircraft ascends.

Reference is now made to FIG. 1 wherein there is shown a tank 10 which may be mounted in any suitable location in the airplane in a usual and accepted manner. The tank is shown for illustrative purposes as a square-shaped container although it may assume any configuration suitable for the particular aircraft in which it is to be contained. A conducting vent 12 is connected to the tank 10 and may be of any desired or necessary length to form a passageway to the atmosphere. The flame arrestor apparatus 14 is preferably located near the end of the vent conductor 12 so that exit passageway 16 might vent directly to atmosphere or through as short a conductor, not shown, as possible. The airflow during ascent is in the direction away from tank 10, as shown by the arrows 18, since the pressure in tank 10 would be greater than that of the atmosphere when the plane is ascending.

Container 14 consists of a closed top 20, a bottom 22 having an outlet 24 to which is connected the exit passageway 16 which extends upwardly and terminates in a flange 26 in spaced relationship to the closed top 20. A surrounding wall 28 interconnects top 20 and bottom 22. Vent 12 is shown as entering the container through the side wall 28, although, of course, it is understood that such a vent could enter from the top or bottom, as well. Intermediate between the exit passageway 16 and wall 28, and extending downwardly from top 20, is an inner divider wall 30 which extends downwardly and inwardly and terminates in spaced relationship to bottom 22. Obviously, the wall 30 could extend down to the bottom 22 and have apertures near the bottom to accomplish the same result as will hereinafter be explained. The passage of fluid between end 32 of the inner divider wall 30 and bottom 22 may be accomplished by the differential pressure of the pressures applied to the surface 34 and 36 of the fluid 38 placed in the fluid trap formed by exit passageway 16, inner divider wall 30 and an outer wall 40. As shown in FIGURE 1, dashed line 42 indicates a normal fluid level but with the airflow in a direction of arrow 18, the surface 34 has been lowered to the end 32 of the divider wall and surface 36 has been raised. Because of the inwardly and downwardly extending taper 44, the fluid surface 34 on the inlet side of the divider wall is depressed downwardly a greater amount than the surface 36 of fluid on the outlet portion of the divider wall is raised. This keeps the surface 36 as low as possible and thus retards spillage out the exit passageway 16 in change of attitude when the vehicle in which such flame arrestor is mounted is ascending. It should be noted that outer wall 40 of the fluid trap is also tapered downwardly and inwardly in a manner similar to the taper 44 of the divider wall 30. This, then, keeps the cross-sectional area of fluid surface 34, and the column fluid under it, reasonably small so that the surface 34 is quickly reduced in height to the edge 32, as shown, without raising surface 36 in the exit portion of the trap a great amount.

Outer wall 40 terminates in an inwardly turned shield 46 in spaced relationship with closed top 20 to permit the flow of air therearound. Below flange 46 and extending outwardly from divider wall 30, is an annular collar 48 which terminates in spaced relationship with the outer wall 40 to permit airflow therearound. Annular collar 48 and flange 46 prevent fluid spillage when the attitude of the vehicle is changed during descent, as will be more apparent with reference to FIG. 2.

Extending inwardly and sloping downwardly from inner wall 30 are a pair of grid collars 50 and 52. These collars have apertures 54 in non-vertical alignment. These apertures break up the airflow and prevent the fluid in the trap from flowing during vehicle ascent. A downwardly extending baffle ring 56 extends from the top 20 inwardly of the innermost aperture 54 and terminates in spaced relationship with the uppermost grid collar 50 to permit airflow therearound. Baffle ring 56 is also spaced from flange 26 to permit air passage therebetween. Uppermost grid collar 50 terminates in a surrounding shield wall 58 which extends downwardly and terminates above the bottom 22. This permits drainage of condensed vapors back down into the fluid trap without permitting airflow up through the drainage passageway 60 and thus by-pass the grid collars 50, 52 and baffle ring 56.

An aircraft having the flame arrestor container 14 of FIG. 1 on climbing to a higher altitude will cause a differential pressure between the atmospheric pressure and the pressure within fuel tank 10. This differential pressure causes an airflow in the direction of arrows 18 in FIG. 1. This airflow path is from the vent 12, between container outer wall 28 and fluid trap outer wall 40 over the outer wall top flange 46 and under the top 20 down between flange 46 and inner divider wall 30 to annular collar 48. The flow goes between collar 48 and flange 46 and between collar 48 and the outer wall 40. The airflow drives the surface 34 downwardly to the lower end 32 of inner divider wall 30 and bubbles up through the fluid on the other side. The fluid then passes through the apertures 54 of grid collars 52 and 50, passes under the baffle ring 56, between the ring 56 and flange 26 and thence downwardly in exit passageway 16 and out the outlet 24. Vapor and fluid particles picked up as the air passes through the fluid trap drains down onto grid collar 50 and since this collar is inwardly and downwardly sloping, it passes into the drainage chamber 60 and down into the fluid trap again.

Figure 2:
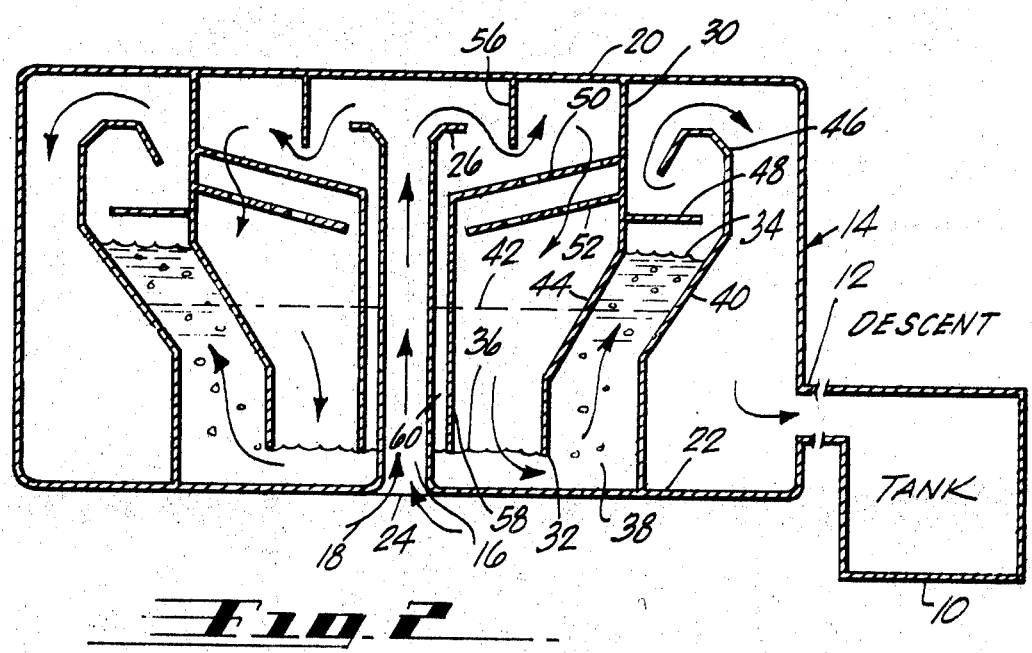
FIG. 2 is a cross-sectional view of a flame arrestor tank showing the fluid levels and airflow direction as the plane descends.

Reference is now made to FIGURE 2 wherein like parts are designated with like numerals. In FIG. 2 the airflow is reversed, as shown by arrows 18, in order to show the change in fluid level when the aircraft is descending and the airflow is from atmosphere, through outlet 24, into the fuel tank 10. Here the fluid surface 36 is down to the lower edge 32 of the inner divider wall 30 to permit air to pass therearound, and surface 34 has been elevated above the reference level line 42. Annular collar 48 extending from inner divider wall 30, and the annular flange 46 prevent spillage of fluid into the vent passageway 12 when descending and the aircraft makes a change in attitude.

What is claimed is:

1. A flame arrestor for insertion in the vent path for a fuel tank near the exit end of said path, said arrestor comprising:
   a container having an inlet and an outlet with an airflow path therebetween;
   a fluid trap in said airflow path through which differential air pressures will cause air to pass in either direction;
   said trap including an outer wall, and an upwardly extending exit passageway wall having a fluid contained therebetween,
   said trap including a fluid dividing means extending downwardly into said fluid to separate said container into an entrance portion and an exit portion;
   said airflow path passing downwardly between said outer wall and said fluid dividing means, and upwardly between said fluid dividing means and said exit passageway wall, said airflow path passing through said fluid,
   said exit portion having a relatively small volume above said fluid trap available for combustible vapors;
   said exit portion having a relatively large vent to atmosphere to thereby reduce pressure build-up upon ignition of said vapors.

2. A flame arrestor as in claim 1,
   said fluid dividing means including an inner passageway divider wall with fluid communicating means at the lower end thereof;
   said inner wall extending upwardly and outwardly to thereby divide said container into uneven portions whereby the height of fluid rise and fall in the entrance portion will be greater than the height of fluid rise and fall in the exit portion.

3. A flame arrestor as in claim 1,
   said fluid dividing means including an inner divider wall extending upwardly and outwardly and dividing said container into said entrance portion and said exit portion;
   said inner wall permitting fluid flow between said portions at the lower end thereof;
   said exit portion having a fluid surface area that increases with fluid height to thereby lessen the rate of fluid rise therein as fluid level in said entrance portion is lowered.

4. A flame arrestor as in claim 1, and
   baffle means to prevent spillage of fluid from said trap when said arrestor is subjected to attitude changes.

5. A flame arrestor as in claim 4,
   said baffle means including an exit passageway exposed to atmosphere at the bottom of said container;
   said exit passageway extending to near the top of said container and communicating with said fluid trap from the top thereof; and
   an annular flange terminating the top of said exit passageway.

6. A flame arrestor as in claim 5,
   a baffle ring extending downwardly from the top of said container; and
   a grid collar extending across the exit portion of said fluid trap, said collar being spaced below said ring;
   said collar having apertures therein outwardly from said ring.

7. A flame arrestor as in claim 1,
   said outer wall terminating below the top of said container in an annular flange;
   said fluid dividing means including an inner passageway divider wall extending downwardly from said top;
   an annular collar extending outwardly from said inner wall and below said flange to form an airflow space therebetween;
   said collar and flange retarding spillage of said fluid during attitude changes while ambient atmospheric pressure is increasing.

8. A flame arrestor as in claim 1,
   said exit portion having an exit passageway extending upwardly from the bottom of said container;
   a shield spaced outwardly from and around said passageway;
   said shield terminating above said bottom and below the upper end of said passageway;
   grid collars extending radially outwardly from said shield and over the exit portion of said fluid trap;
   said collars having apertures therein to permit air passage therethrough.

9. A flame arrestor as in claim 8, said grid collars including at least two vertically spaced inwardly sloping collars each having apertures laterally displaced from apertures in the other of said collars.

10. A flame arrestor as in claim 7,
one of said collars being connected to the upper edge of said shield whereby fluid on the top of said collar will drain into the space between said shield and said passageway.

References Cited

FOREIGN PATENTS 753,829 8/1956 Great Britain.
506,721 9/1930 Germany.

RAPHAEL H. SCHWARTZ, Primary Examiner